United States Patent
Tonne

[11] Patent Number: 5,950,464
[45] Date of Patent: Sep. 14, 1999

[54] GEAR SHIFT LEVER QUICK RELEASE LOCKING SYSTEM

[76] Inventor: Harry E. Tonne, 25 7th Ave., Roebling, N.J. 08554

[21] Appl. No.: 09/022,370

[22] Filed: Feb. 12, 1998

[51] Int. Cl.⁶ .................................................. B60R 25/06
[52] U.S. Cl. .................................. 70/247; 70/202; 70/237
[58] Field of Search ............................ 70/202, 201, 203, 70/245, 246, 247, 237, 238, 211, 212

[56] References Cited

U.S. PATENT DOCUMENTS

| | | | |
|---|---|---|---|
| 1,043,726 | 11/1912 | Riddell | 70/203 |
| 1,185,285 | 5/1916 | Brewster | 70/371 |
| 1,320,800 | 11/1919 | Saxton et al. | 70/201 |
| 1,333,093 | 3/1920 | Pierce | 70/203 |
| 1,388,035 | 8/1921 | Gorden | 70/201 |
| 1,480,149 | 1/1924 | Carpenter | 70/203 |
| 1,545,287 | 7/1925 | Stephenson | 70/203 |
| 3,967,475 | 7/1976 | Zane | 70/18 |
| 4,791,795 | 12/1988 | Burgess et al. | 70/202 |
| 4,993,248 | 2/1991 | Nordberg | 70/247 |
| 5,473,918 | 12/1995 | Hixon | 70/238 |
| 5,689,982 | 11/1997 | Chang | 70/247 |

FOREIGN PATENT DOCUMENTS

| | | | |
|---|---|---|---|
| 618021 | 2/1949 | United Kingdom | 70/58 |
| 8706897 | 11/1987 | WIPO | 70/247 |

Primary Examiner—Darnell M. Boucher

[57] ABSTRACT

A shift lever locking mechanism is provided including a shift lever having a vertical post slidably situated along a single linear slot formed in a surface of a vehicle to effect various modes of operation including: drive, second gear, and first gear. Also included is an engagement arm pivotally coupled to the surface. A quick release mechanism serves to releasably couple the engagement arm to the shift lever for precluding the transfer of the shift lever from the drive mode of operation.

6 Claims, 2 Drawing Sheets

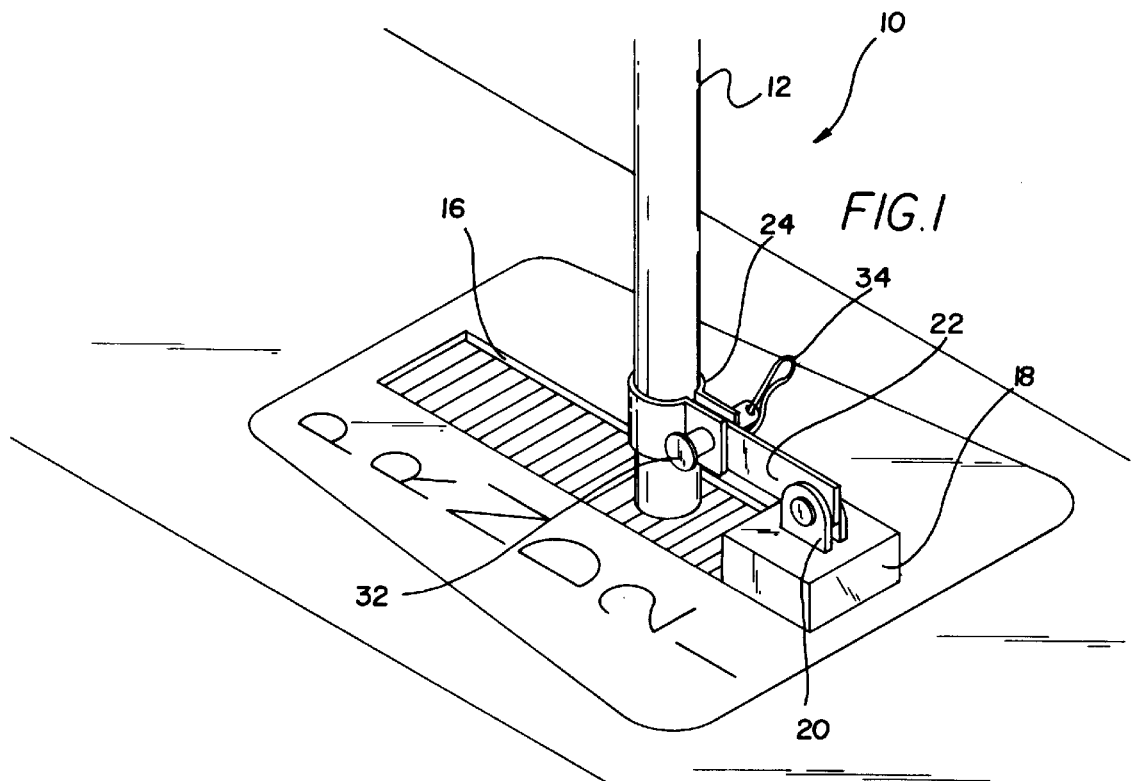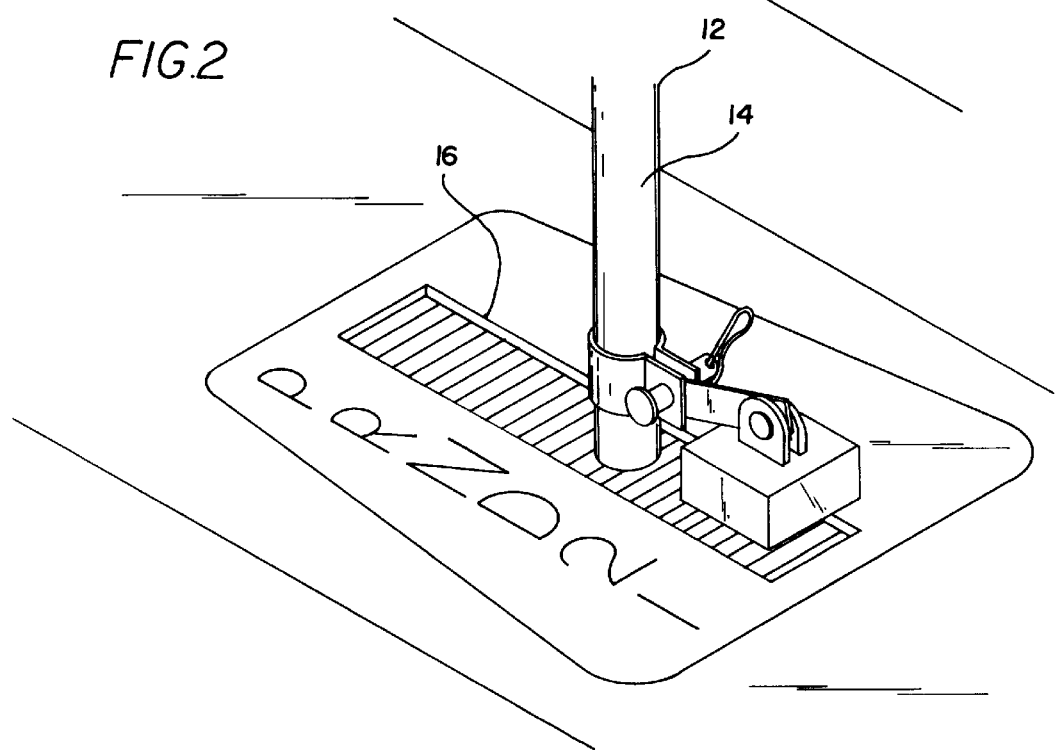

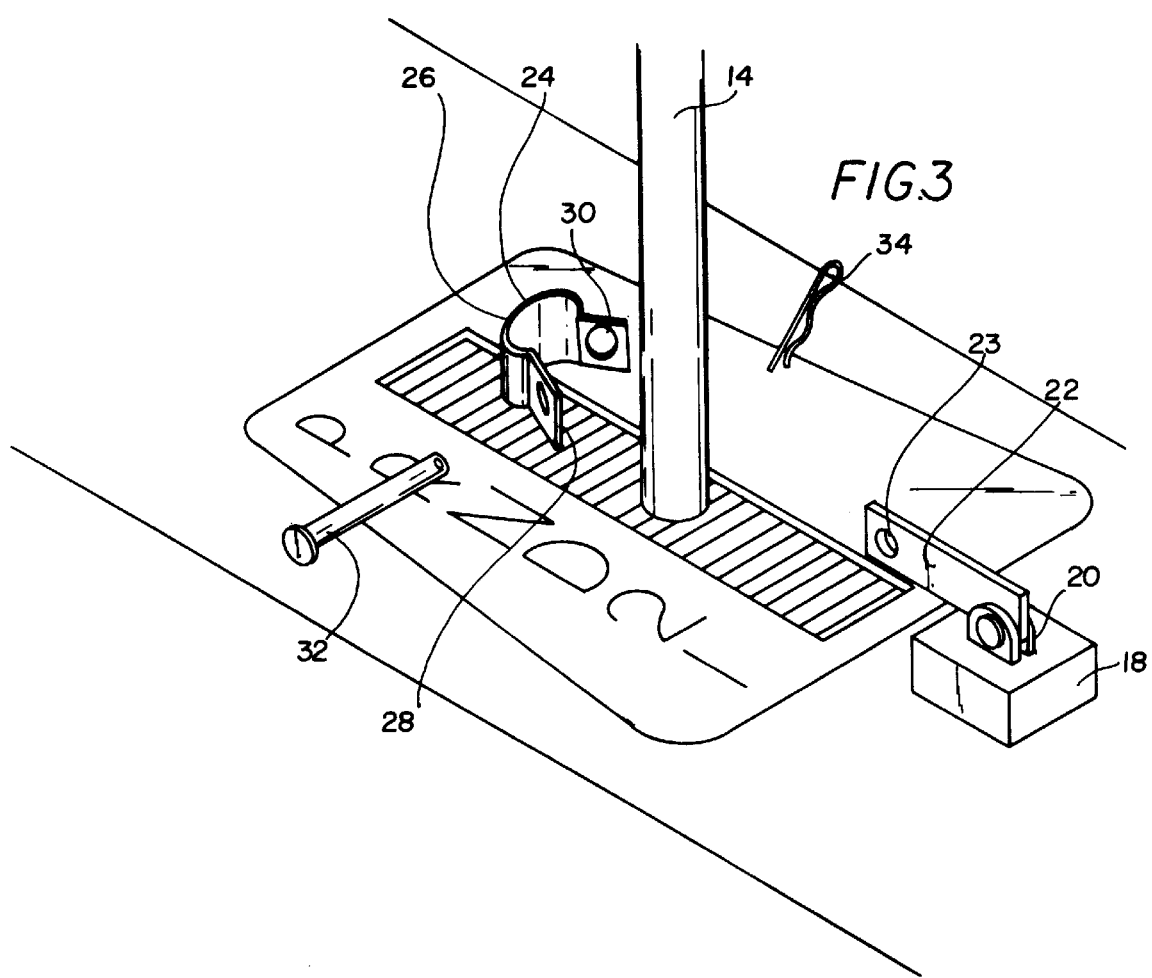

GEAR SHIFT LEVER QUICK RELEASE LOCKING SYSTEM

BACKGROUND OF THE INVENTION

1. Field of the Invention

The present invention relates to key-actuated gear shift locks and more particularly pertains to a new gear shift lever quick release locking system for preventing transaxle damage incurred by a driver unknowingly shifting to a wrong gear.

2. Description of the Prior Art

The use of key-actuated gear shift locks is known in the prior art. More specifically, key-actuated gear shift locks heretofore devised and utilized are known to consist basically of familiar, expected and obvious structural configurations, notwithstanding the myriad of designs encompassed by the crowded prior art which have been developed for the fulfillment of countless objectives and requirements.

Known prior art key-actuated gear shift locks include U.S. Pat. No. 5,038,667; U.S. Pat. No. 4,077,276; U.S. Pat. No. 4,993,248; U.S. Pat. No. 4,030,323; U.S. Pat. No. 4,693,099; and U.S. Pat. Des. 317,707.

In these respects, the gear shift lever quick release locking system according to the present invention substantially departs from the conventional concepts and designs of the prior art, and in so doing provides an apparatus primarily developed for the purpose of preventing transaxle damage incurred by a driver unknowingly shifting to a wrong gear.

SUMMARY OF THE INVENTION

In view of the foregoing disadvantages inherent in the known types of key-actuated gear shift locks now present in the prior art, the present invention provides a new gear shift lever quick release locking system construction wherein the same can be utilized for preventing transaxle damage incurred by a driver unknowingly shifting to a wrong gear.

The general purpose of the present invention, which will be described subsequently in greater detail, is to provide a new gear shift lever quick release locking system apparatus and method which has many of the advantages of the key-actuated gear shift locks mentioned heretofore and many novel features that result in a new gear shift lever quick release locking system which is not anticipated, rendered obvious, suggested, or even implied by any of the prior art key-actuated gear shift locks, either alone or in any combination thereof.

To attain this, the present invention generally comprises a shift lever comprising a vertical post slidably situated along a single linear slot formed in a horizontal surface of a vehicle. Sliding of the post effects the transfer of the vehicle between various modes of operation. Such modes of operation include in order from a first end to a second end of the slot: park, reverse, neutral, drive, second gear, and first gear. Note FIG. 1. Next provided is a block with a rectangular configuration. Such block is adhesively mounted to the horizontal surface adjacent to the second end of the slot. The block has a top face with a pair of upwardly extending legs coupled thereto. The pair of upwardly extending legs have a pair of aligned apertures formed therein about an axis. This axis remains perpendicular with respect to the slot of the vehicle. Also included is an engagement arm having a planar rectangular configuration. A first end of the engagement arm is pivotally coupled between the upwardly extending legs of the block via a pivot pin. As such, the engagement arm is adapted to pivot about the axis associated with the apertures of the upwardly extending legs of the block. For reasons that will soon become apparent, the arm has a second end with a bore formed therein. Further, a length of the engagement arm is equal to a distance between a position of the shift lever corresponding to the drive mode of operation and the second end of the slot. A clamp includes a vertically oriented cylindrical portion secured to the shift lever adjacent to its lower end. The clamp includes a pair of free ends each having a square planar tab coupled thereto and extending therefrom in a spaced parallel relationship. As such, the tabs define a vertically oriented slot therebetween. The planar tabs of the clamp also have a pair of axially aligned holes formed therein. Lastly, a pin is provided having a cylindrical configuration and including a first end having an circular flange formed thereon. A second end of the pin is equipped with a diametrically disposed opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new gear shift lever quick release locking system apparatus and method which has many of the advantages of the key-actuated gear shift locks mentioned heretofore and many novel features that result in a new gear shift lever quick release locking system which is not anticipated, rendered obvious, suggested, or even implied by any of the prior art key-actuated gear shift locks, either alone or in any combination thereof.

It is another object of the present invention to provide a new gear shift lever quick release locking system which may be easily and efficiently manufactured and marketed.

It is a further object of the present invention to provide a new gear shift lever quick release locking system which is of a durable and reliable construction.

An even further object of the present invention is to provide a new gear shift lever quick release locking system which is susceptible of a low cost of manufacture with regard to both materials and labor, and which accordingly is then susceptible of low prices of sale to the consuming public, thereby making such gear shift lever quick release locking system economically available to the buying public.

Still yet another object of the present invention is to provide a new gear shift lever quick release locking system which provides in the apparatuses and methods of the prior art some of the advantages thereof, while simultaneously overcoming some of the disadvantages normally associated therewith.

Still another object of the present invention is to provide a new gear shift lever quick release locking system for preventing transaxle damage incurred by a driver unknowingly shifting to a wrong gear.

Even still another object of the present invention is to provide a new gear shift lever quick release locking system that includes a shift lever having a vertical post slidably situated along a single linear slot formed in a surface of a vehicle to effect various modes of operation including: drive, second gear, and first gear. Also included is an engagement arm pivotally coupled to the surface. A quick release mechanism serves to releasably couple the engagement arm to the shift lever for precluding the transfer of the shift lever from the drive mode of operation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new gear shift lever quick release locking system according to the present invention.

FIG. 2 is a perspective view of the present invention prior to the block being mounted in place.

FIG. 3 is an exploded perspective view of the present invention.

DESCRIPTION OF THE PREFERRED EMBODIMENT

With reference now to the drawings, and in particular to FIGS. 1 through 3 thereof, a new gear shift lever quick release locking system embodying the principles and concepts of the present invention and generally designated by the reference numeral 10 will be described.

As shown in the various Figures, the present invention, designated as numeral 10, includes a shift lever 12 comprising a vertical post 14 slidably situated along a single linear slot 16 formed in a horizontal surface of a vehicle. Sliding of the post effects the transfer of the vehicle between various modes of operation. Such modes of operation include in order from a first end to a second end of the slot: park, reverse, neutral, drive, second gear, and first gear. Note FIG. 1.

Next provided is a block 18 with a rectangular configuration. Such block is adhesively mounted to the horizontal surface adjacent to the second end of the slot. As shown in the Figures, the block has a width equal to that of the slot. The block has a top face with a pair of upwardly extending legs 20 coupled to its central extent. The pair of upwardly extending legs have a pair of aligned apertures formed therein about an axis. This axis remains perpendicular with respect to the slot of the vehicle.

Also included is an engagement arm 22 having a planar rectangular configuration. A first end of the engagement arm is pivotally coupled between the upwardly extending legs of the block via a rivet. As such, the engagement arm is adapted to pivot about the axis associated with the apertures of the upwardly extending legs of the block. Further, a plane in which the arm resides is the same as that in which the post of the shift lever resides.

For reasons that will soon become apparent, the arm has a second end with a bore 23 formed therein. Further, a length of the engagement arm is equal to a distance between a position of the shift lever corresponding to the drive mode of operation and the second end of the slot.

A clamp 24 includes a vertically oriented cylindrical portion 26 secured to the shift lever adjacent to its lower end. An elevation of the clamp is preferably common with the top surface of the block. The clamp includes a pair of free ends each having a square planar tab 28 coupled thereto and extending therefrom in a spaced parallel relationship. As such, the tabs define a vertically oriented slot therebetween. The planar tabs of the clamp also have a pair of axially aligned holes 30 formed therein. Preferably, a means of securement such as friction or adhesive is employed to maintain the clamp at the desire elevation.

Lastly, a pin 32 is provided having a cylindrical configuration and including a first end having an circular flange formed thereon. A second end of the pin is equipped with a diametrically disposed opening.

Upon the shift lever being situated in the position corresponding to the drive mode of operation, the engagement arm may be lowered with the slot of the clamp. Thereafter, the pin is inserted within the bore and holes of the engagement arm and clamp, respectively. Next, a quick release lock clip 34, preferably in the shape of a bobby pin, is inserted within the opening of the pin for precluding the shift lever from being shifted into positions corresponding to the first gear and second gear mode of operation. As such, serious damage to the transmission of the vehicle is avoided.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shift lever locking mechanism comprising, in combination:

a shift lever including a vertical post slidably situated along a single linear slot formed in a horizontal surface of a vehicle to effect various modes of operation including in order from a first end to a second end of the slot: park, reverse, neutral, drive, second gear, and first gear;

a block with a rectangular configuration adhesively mounted to the horizontal surface adjacent to the second end of the slot, the block having a top face with a pair of upwardly extending legs coupled thereto and having a pair of aligned apertures formed therein about an axis which remains perpendicular with respect to the slot of the vehicle;

an engagement arm having a planar rectangular configuration with a first end pivotally coupled between the upwardly extending legs of the block and adapted to pivot about the axis associated therewith, the arm having a second end with a bore formed therein and a length equal to a distance between a position of the shift lever corresponding to the drive mode of operation and the second end of the slot;

a clamp including a vertically oriented cylindrical portion secured to the shift lever adjacent to a lower end thereof, the clamp including a pair of free ends each having a square planar tab coupled thereto and extending therefrom in a spaced parallel relationship for defining a vertically oriented slot therebetween, the planar tabs of the clamp having a pair of axially aligned holes formed therein; and a pin having a cylindrical configuration including a first end having an circular flange formed thereon and a second end with a diametrically disposed opening, whereby upon the shift lever being situated in the position corresponding to the drive mode of operation, the engagement arm may be lowered with the slot of the clamp and the pin inserted within the bore and holes of the engagement arm and clamp, respectively, and a lock clip inserted within the opening of the pin for precluding the shift lever from being shifted into positions corresponding to the first gear and second gear mode of operation.

2. A shift lever locking mechanism comprising:

a shift lever including a vertical post slidably situated along a single linear slot formed in a surface of a vehicle to effect various modes of operation including: drive, second gear, and first gear;

a block coupled to the surface adjacent the slot, the block having a top face with a pair of upwardly extending legs coupled thereto and having a pair of aligned apertures, formed therein;

an engagement arm having a pair of opposite ends, one of the ends of the engagement arm being pivotally coupled to the shift lever, the other of the ends of the engagement arm being pivotally coupled between the upwardly extending legs of the block; and a quick release mechanism adapted to releasably couple the engagement arm between the shift lever and the surface for precluding the transfer of the shift lever from the drive mode of operation.

3. A shift lever locking mechanism as set forth in claim 2 wherein the quick release mechanism includes a separate free pin and the engagement arm has a bore formed therein for receiving the pin.

4. A shift lever locking mechanism as set forth in claim 3 wherein the quick release mechanism further includes a clamp mounted on the shift lever with at least one hole for receiving the pin.

5. A shift lever locking mechanism as set forth in claim 3 wherein the pin has an opening for receiving a locking clip for precluding the release of the pin from the bore of the engagement arm.

6. A shift lever locking mechanism as set forth in claim 2 wherein the engagement arm is pivotally coupled about an axis residing in perpendicular relationship with the slot.

* * * * *